INVENTORS.
THEODORE F. NOVAK
RICHARD D. FROULA
BY WILLIAM E. SINDELAR
Wolfe, Hubbard, Voit & Osann
ATTORNEYS.

Feb. 9, 1971　　W. E. SINDELAR ET AL　　3,561,063

VERTICALLY ORIENTED INJECTION MOLDING MACHINE

Filed June 24, 1968　　11 Sheets-Sheet 6

INVENTORS.
THEODORE F. NOVAK
RICHARD D. FROULA
WILLIAM E. SINDELAR
BY Wolfe, Hubbard, Voit & Osann
ATTORNEYS.

United States Patent Office 3,561,063
Patented Feb. 9, 1971

3,561,063
VERTICALLY ORIENTED INJECTION MOLDING MACHINE
William E. Sindelar, Westmont, Theodore F. Novak, La Grange, and Richard D. Froula, Brookfield, Ill., assignors to Danly Machine Corporation, Chicago, Ill., a corporation of Illinois
Filed June 24, 1968, Ser. No. 739,566
Int. Cl. B29f 1/00
U.S. Cl. 18—30                                    10 Claims

ABSTRACT OF THE DISCLOSURE

A vertically oriented injection molding machine capable of developing several thousand tons or more force to hold upper and lower mold parts defining a mold cavity together including an upright frame with a bed to receive the mold parts, an upper power slide carrying the upper mold part that is rapidly stroked downwardly to a predetermined position short of contact with the lower mold part at which time the power slide is retained at its downward extent and fluid pressure cooperates with a lower slide member to pull the upper mold part the additional distance down onto the lower mold part and clamping the mold parts together while plastic is injected into the mold cavity. Also included are limits for the amount of force developed in pulling the upper power slide down, providing auxiliary fluid pressure to strip and separate the upper mold part from the lower mold part after the molding operation is complete and insuring that the upper power slide will not fall if a power or other failure occurs.

---

The present invention relates generally to injection molding machines and, more particularly, to vertically oriented injection molding machines characterized by their ability to economically develop required forces of substantial magnitude for holding the mold parts together while injecting molding material into the mold cavity. While not so limited in its application, the injection molding machines to which this invention is directed can develop forces in the order of, for example, several thousand tons or more without necessitating excessive space requirements while at the same time permitting the repetitive molding of articles in a minimum amount of time.

In the past, large injection molding machines (i.e., those capable of developing at least several hundred tons of force) necessary for the production of specialized parts, for example, those required in the automotive industry, were almost universally of the horizontal type. In other words, the movement of the movable platen or mold was in the horizontal direction. While such horizontal injection molding machines were suitable for forming such parts, the space requirements, in terms of the square feet of the plant area utilized, were quite large and the machine cycle time relatively long. Moreover, the forces involved required hydraulic cylinders of mass proportions because of the large quantity of fluid that was thereby necessitated to produce the requisite loads. A large number of pumps and more complex control devices also had to be provided for handling the fluid.

To alleviate these problems, mechanical force multiplying structures such as levers and toggle linkages were utilized, generally being actuated by hydraulic systems. While these devices permitted more economical use of the available space, it was necessary to carefully engineer these devices and the machine cycle time usually was not significantly shortened.

The use of vertical injection molding machines has in the past been limited almost entirely to uses wherein the magnitude of the forces that must be developed is relatively small, one of the primary reasons being that the hydraulic system associated with a vertical machine was located in an overhead position. However, vertical injection molding machines had not been devised which could use a more economical arrangement and they were not considered for applications where large forces are required.

There is thus a need to provide a vertical injection molding machine that can be utilized to develop a magnitude of up to several thousand tons or more force and yet which allows optimum use of the advantages associated with a vertical arrangement, such as, for example, simplifying the procedure associated with the changing of the mold and allowing easy access to the machine for maintenance purposes.

Accordingly, it is a primary object of this invention to provide vertical molding machines characterized by their capability to develop forces of substantial magnitude yet which are of an economical and relatively compact arrangement.

Another aspect of this invention includes the provision of vertical injection molding machines of the above-described type wherein the total cycle time necessary to repetitively mold an article is relatively short. A related and more specific object of the present invention is to provide vertical injection molding machines wherein the time elapsed in carrying out the downward stroke of the upper mold is minimized.

Another and more specific object of this invention is to develop the necessary force to hold the mold parts or platens together by employing a hydraulic system that is positioned below the mold.

A still further aspect includes vertical injection molding machines of the above-described type wherein the amount of stroke of the main cylinder can be controlled.

Still another aspect of the invention includes the provision, in vertical injection molding machines of the above-described type, of a substantially tight fit between the plasticized material feed and the distribution means for conveying the plastic material to the mold cavity yet wherein the feed can be quickly connected and disconnected as desired.

A further object includes providing vertical injection molding machines wherein auxiliary means are employed to overcome the forces holding the mold parts together after an article has been molded to quickly separate the mold. In this connection, a related object is to provide for automatically adjusting the distance through which these auxiliary means operate.

A still further object of this invention is to provide vertical injection molding machines wherein the upper power slide is automatically held in a fixed position whenever an electrical and/or hydraulic power failure occurs.

Other objects and advantages of the invention will become apparent upon reading the attached detailed description and upon reference to the drawings, in which:

While the invention is susceptible to various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims. For example, while the exemplary embodiment has been described in connection with a molding machine capable of developing several thousand tons or more force, the invention is not so limited. Rather, the invention is applicable to molding machines of any size that utilize any of the several features of this invention.

GENERAL MACHINE ORGANIZATION

Figure 1:
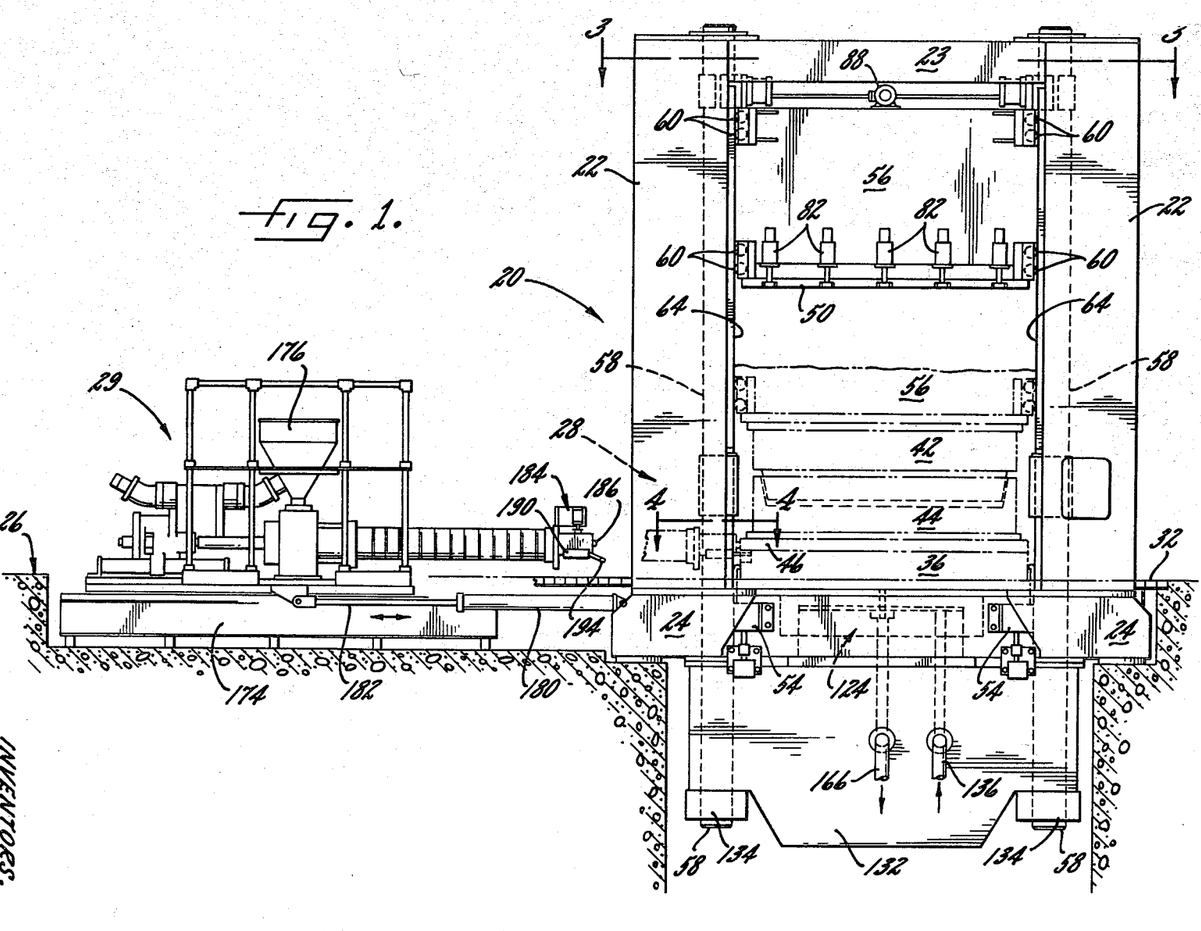
FIG. 1 is a front elevation view illustrating one exemplary embodiment of a vertical injection molding machine in accordance with the subject invention, and illustrating the spatial relationship between the mechanism forwarding the plasticized material and the main frame of the machine.
Figures 2, 3:
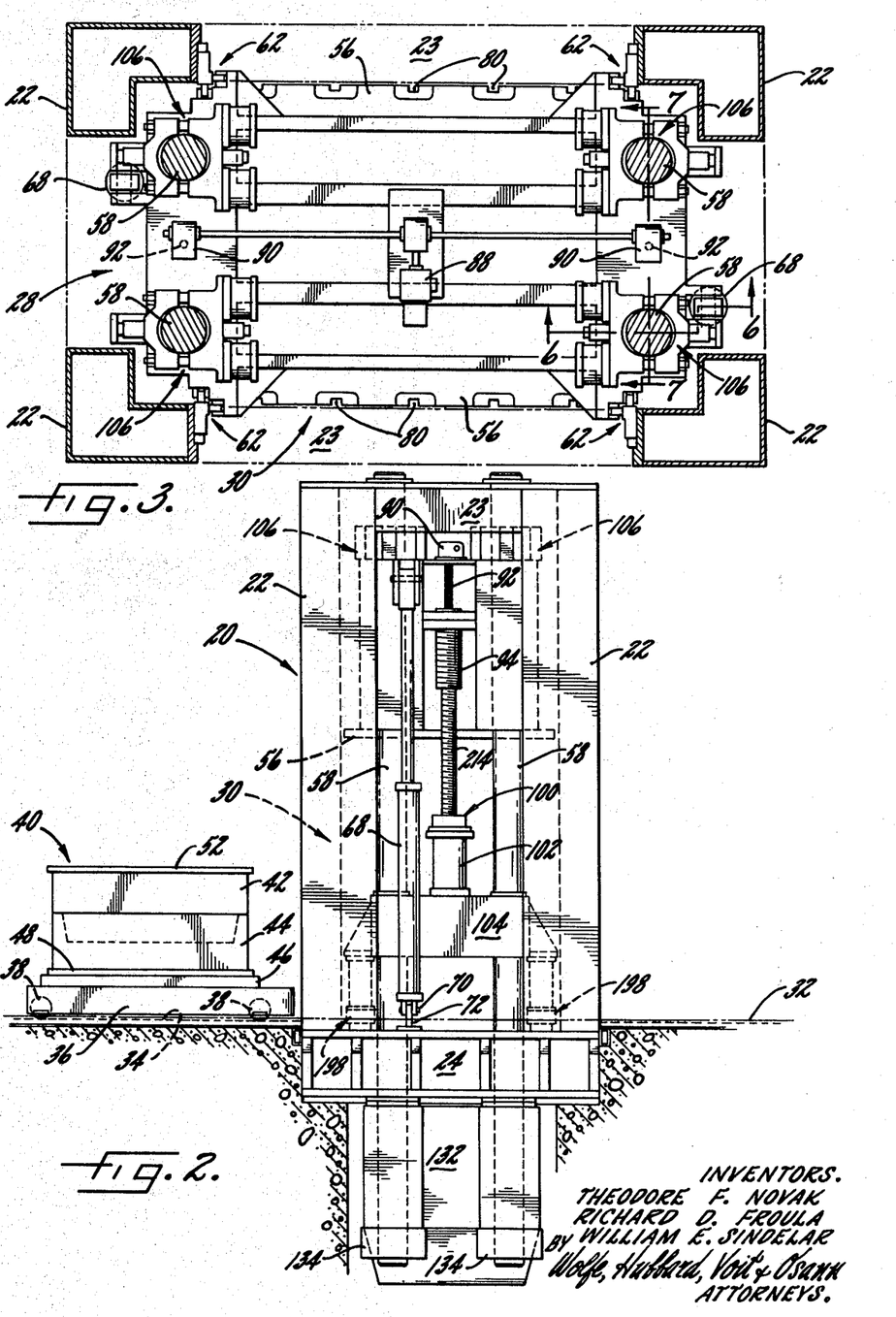
FIG. 2 is an end elevation view of the exemplary embodiment of FIG. 1 and depicting one method of quickly positioning a mold into the machine.
FIG. 3 is a cross sectional view taken substantially along line 3—3 of FIG. 1 and illustrating the mechanism for automatically adjusting the shut height of the power slide.

Turning now to the drawings. FIGS. 1 and 2 illustrate an exemplary embodiment of a vertical injection molding machine, generally indicated at 20, in accordance with the subject invention. As shown in FIG. 1, the molding machine 20 includes an upright rectangular frame defined by four spaced vertical columns 22, upper cross members 23 and a bed 24 that can be advantageously located adjacent ground level, indicated at 26, to provide for easy access for purposes such as, for example, maintenance. The upright frame 22 has an open area on the side, as indicated at 28 so that the mechanism 29 for injecting the plastic material into the mold cavity can be moved into and out of engagement (see FIGS. 1 and 4). Similarly, the back portion of the upright frame 22 includes a space indicated at 30 (FIGS. 1 and 2) so that a mold that is to be used can be easily introduced into the machine. Also, and as illustrated, the other side of the frame 22 can also be open so that access for maintenance is provided on four sides.

Still referring to FIG. 1, and as will hereinafter be described in detail, the vertically oriented injection molding machine of this invention is directed to the raising, lowering and clamping the mold halves together in a unique and particularly advantageous way that contemplates a rapid downward stroking of an upper power slide carrying the upper mold half to a predetermined position short of contact with the lower mold half, retaining the power slide in that position and actuating fluid operated means from beneath the mold half to pull the upper mold half the additional distance down onto the lower half and clamping the mold together while the plastic material is injected into the mold cavity.

In addition to the functions described above, the illustrative embodiment also includes, in general, novel provisions for positioning the mold halves in the machine, limiting by means such as a relief valve the amount of force developed during actuation of the main clamp cylinder, stripping the upper mold half from the lower mold half following completion of the molding and insuring that the power slide will not fall if a power or other failure occurs.

POSITIONING OF MOLD

Figures 6, 7:
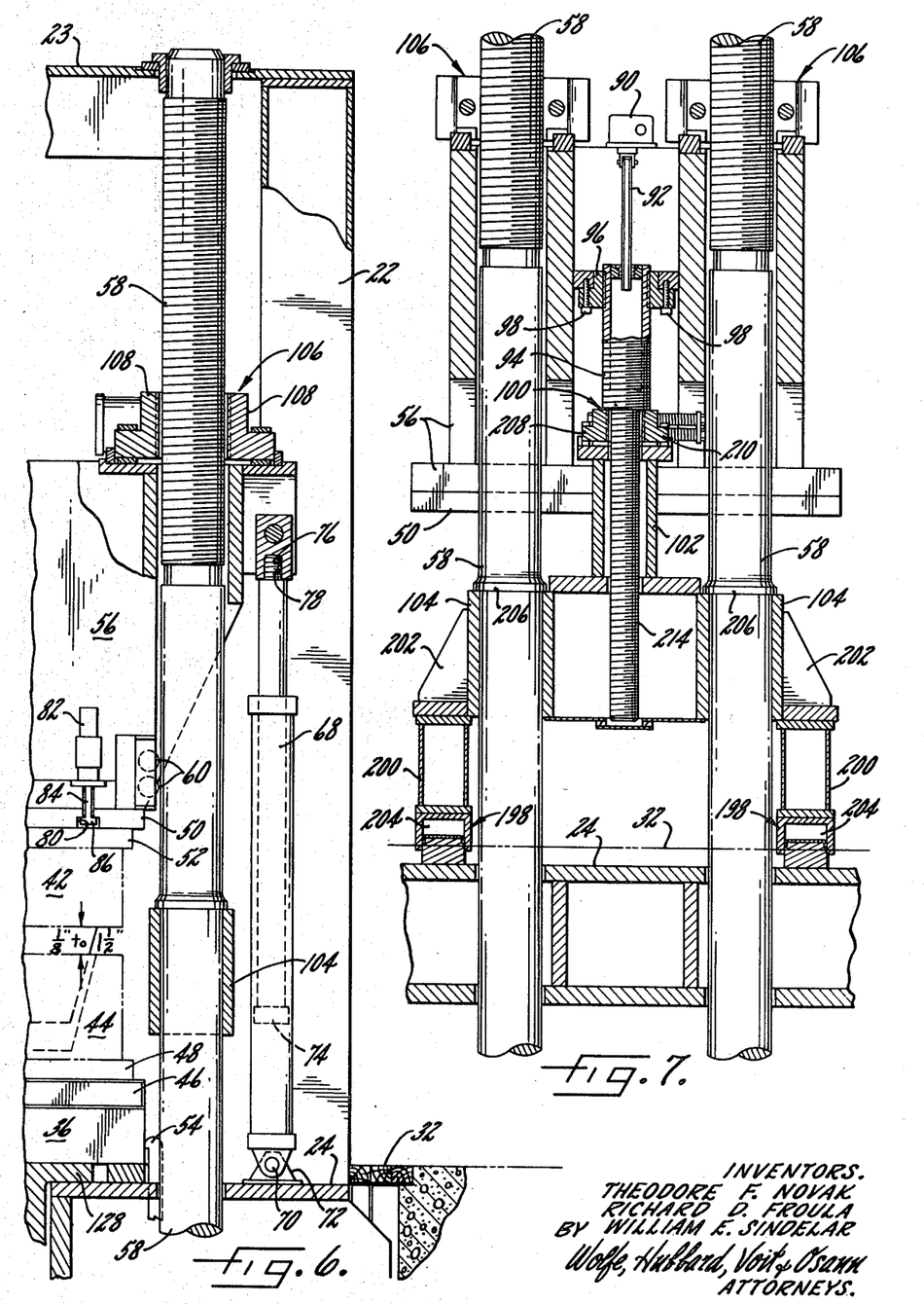
FIG. 6 is a cross sectional view taken substantially along offset line 6—6 of FIG. 3, except that the upper power slide is at its downward extent and depicting the hydraulic mechanism for raising and lowering the upper slide of the machine.
FIG. 7 is a cross sectional view taken substantially along line 7—7 of FIG. 3, except that the upper power slide is at its downward extent and showing the auxiliary or stripping cylinders used to separate the mold.

The vertically oriented injection molding machine of this invention thus takes advantage of the several advantages of a vertical arrangement, including allowing a mold to be quickly and easily introduced or replaced. To this end, and as best seen in FIGS. 2 and 6, the floor 32 has a set of tracks 34 adjacent a side of the machine. A bolster-carrier 36 mounted on wheels 38 rides on the tracks 34 to carry a mold 40 into position within the frame 22. The mold 40 comprises an upper mold portion 42 and a lower mold portion 44 which define a mold cavity therebetween. The lower mold portion 44 rests on a hot runner plate 46 that serves, as will hereinafter be described, as a distribution means for the plasticized material and communicates with the mold cavity. The hot runner plate 46 is detachably mounted to the lower mold portion 44 in any suitable manner, such as by bolts (not shown) attached to a flange 48 formed on the lower mold portion. The hot runner plate 46 is similarly held in place on the bolster-carrier 36 by any suitable means such as bolts (not shown).

In similar fashion, the upper mold portion 42 is detachably connected to an adapter plate 50 by bolts (not shown). The upper mold portion 42 can be formed with an integral flange 52 to receive the bolts. When the mold is positioned in the machine 20 as indicated in FIG. 1, the wheels 38 of the bolster-carrier 36 are raised so that the carrier rests on the bed 24 of the upright frame. The bolster-carrier 36 can be detachably held in place against the bed 24 in any suitable manner, such as, for example, by bolster clamps 54 (FIGS. 1 and 6).

UPPER POWER SLIDE STROKE

Figure 8:
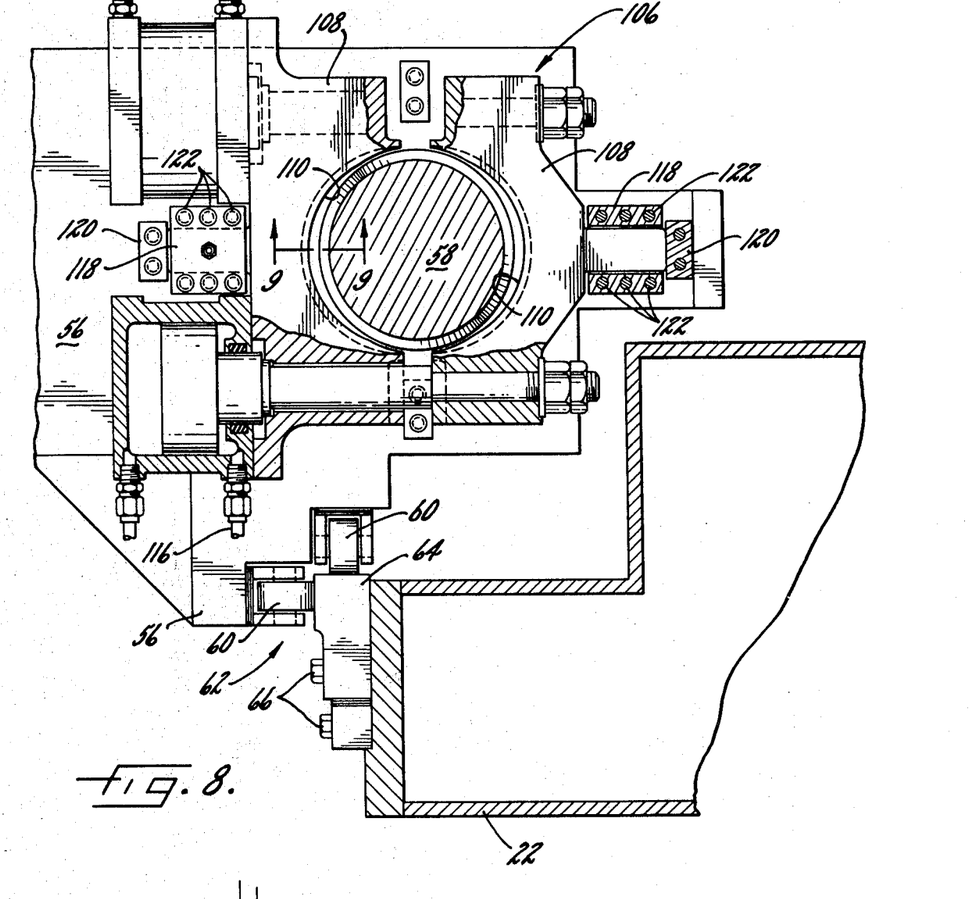
FIG. 8 is an enlarged, fragmentary detailed view of one of the split nut clamps shown in FIG. 3, and illustrating the clamp in an open position.

In accordance with one feature of this invention, provision is made for rapid downward stroking of the upper power slide 56 thereby minimizing the amount of time that is required to close the mold and reducing the machine cycle time for molding an article. To this end, and as best illustrated by reference to FIGS. 3, 6, and 8 conjointly, the upper power slide 56 is mounted for relative movement on a plurality of drive members or pull rods 58. The pull rods 58 are in turn slidably mounted in the upright frame 23 and are positioned adjacent each corner of the rectangular frame columns 22. In order to guide the power slide within the frame and avoid frictional drag during relative movement of the slide 56 with respect to the frame, a plurality of rollers 60 are mounted on the upper power slide 56 (FIG. 8). The rollers 60 are mounted at right angles with respect to each other adjacent each corner 62 of the columns 22 and ride on a roller gib 64 suitably attached to the corner 62 by bolts 66 or the like.

Referring to FIGS. 2 and 6, the exemplary means for effecting the rapid downward stroke of the slide includes a plurality of hydraulically operated pull rod cylinders 68 attached at one end to the bed 24 by a pin 70 and anchor 72. Pull rod pistons 74 are mounted in the cylinders 68 and terminate in a threaded portion 76 which is screwed into the complementally shaped threaded hole 78 of the upper power slide 56. Applying hydraulic pressure to the pull rod cylinders 68 cause the pistons 74 to move upwardly and causes the upper power slide 56 to pass through an upward stroke of suitably about 60 inches. Releasing the pressure supplied to pull rod cylinders 68 allows the upper power slide 56 to roll downwardly, aided by gravity. The rate at which the power slide descends can be easily controlled by varying the release of the hydraulic pressure. The power slide can move downwardly at rates, for example, up to 1200 inches per minute or more. The stored potential energy in the upper slide can also be advantageously utilized on the downstroke to generate electrical power.

When the supply power slide 56 is in its downward position, the upper mold portion 42 may be quickly connected to the power slide by using any means. To achieve quick connection, the adapter plate 50 can be formed with a series of T-shaped slots 80 and the power slide 56 can include an equal number of air clamps 82, each with an arm 84 and an attached head 86. The upper mold portion 42 can then be quickly connected or disconnected by activating the clamps 82 to pivot the heads 86 so they can slip out of the slots 80. For further details of a mechanism that can be used to clamp dies or molds to a power slide cross reference is made to U.S. Pat. 3,111,100 to Georgeff, assigned to the assignee of the present application.

SHUT HEIGHT ADJUSTMENT

In accordance with another feature of the present invention the machine 20 is provided with means for automatically adjusting the initial downward limit of the power slide rapid stroke or the "shut height" of the upper slide 56. Accordingly, and as best seen in FIGS. 3 and 7, a motor 88 and a plurality of reducers 90 are connected by a spline 92 to an adjustable screw 94. The adjustable screw 94 is attached to the upper power slide 56 by a threaded collar 96 that is mounted on the upper power slide 56 by any suitable means such as by bolts 98. The adjustable screw 94 contacts at its downward limit a stop 100 that as will hereinafter be developed, serves as a safety feature and is in turn mounted on an upstanding support 102 that is connected to a crosshead 104. The crosshead 104 is in turn connected to the pull rods 58. The adjustable screw 94 will generally be adjusted at the start of molding a particular article to provide a shut height adjustment such that the initial downward extent of the stroke of the upper power slide 56 leaves from about ⅛ to 1½ inches between the upper mold portion 42 and the lower mold portion 44 (see FIG. 6).

The downward stroke of the upper power slide 56 can thus be adjusted to provide that the least amount of time elapses during the initial down stroke. Suitably, the travel can initially begin at a high speed of up to about 1200 inches per minute and then be adjusted to a slower speed of between zero to 150 inches per minute so that bringing the upper mold portion 42 down onto the lower mold portion 44 can be accomplished within a minimum period of time.

LOCKING THE UPPER POWER SLIDE IN POSITION

Figure 9:
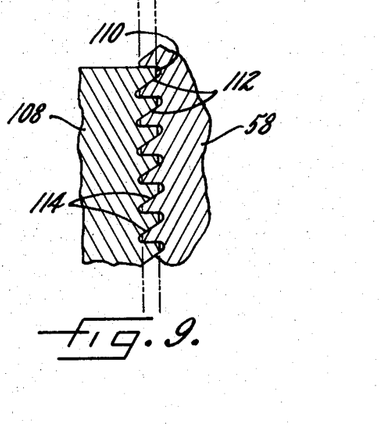
FIG. 9 is a fragmentary cross sectional view taken substantially along line 9—9 of FIG. 8, except that the clamp is illustrated as being in the closed position.

In accordance with still another feature of this invention, provision is made for automatically locking the upper power slide to the pull rods when the slide reaches the limit of its downward stroke. To this end, the molding machine 20 includes a plurality of split nuts 106 (FIGS. 3 and 8), each including a pair of substantially identical portions 108 that include arcuate portions 110 that are disposed about the periphery of a pull rod 59. The arcuate portions 110 have a grooved surface as indicated at 112 (FIG. 9) to mate with the grooved external periphery 114 of the pull rod 58. Each split nut 106 can be actuated by air from a source (not shown) and through a conduit 116 to bring the two portions 108 together and intermesh the grooved surfaces 112 of the split nut and 114 of the pull rod 58 when the upper power slide 56 reaches its initial downward limit.

Suitable guides 118 and stops 120 can be provided to limit the outward extent of the split nut portions 108 when they are in an open position (see FIGS. 3 and 8). The split nut assemblies 106 can also be attached to the power slide 56 by any convenient means such as by bolts 122. The attachment of the upper power slide 56 to the pull rods 58 allows the development of the force necessary to hold the mold 40 together, as will be hereinafter explained.

DEVELOPMENT OF FORCE IN MAIN CLAMP CYLINDER

In accordance with another aspect of the vertical injection molding machine of this invention, there is provided a means capable of developing force of several thousand tons or more to hold the mold parts together without the use of an overhead hydraulic system. Accordingly, and as can be seen by reference to FIGS. 1, 10, and 11, conjointly, there is provided a main clamp cylinder 124 including a head 126 with a flanged portion 128 which is positioned between the bolster-carrier 36 and the bed 24. A piston 130 forms part of a lower power slide 132 that is fixed to the lower ends of the pull rods 58 by nuts 134. Fluid under pressure can be introduced through conduits 136 to force the piston downward. This forces the lower slide 132 downwardly and also pulls the upper power slide 56 and mold portion 42, made immovable with respect to the pull rods 58 by the split nuts 106, downwardly through the distance or stripping stroke length that was previously set during the shut height adjustment.

RELIEF VALVE

Still another feature of the present invention includes provision for limiting the maximum travel of the main clamp cylinder so as to avoid possible damage to the machinery. Thus, if the hydraulic pressure introduced between the head 126 and the piston 130 exceeds the amount needed to move the upper mold portion 42 through the previously adjusted stripping stroke, means are provided to permit an additional predetermined travel and then cause the force to be dissipated. Generally, an additional travel of anywhere from ½ inch to 1½ inches or more has been found suitable.

To accomplish this objective, a relief valve 138 (FIGS. 10 and 11) is provided. The valve stem 158 is attached to the head 126 by any suitable means such as nut 142.

Figure 10:
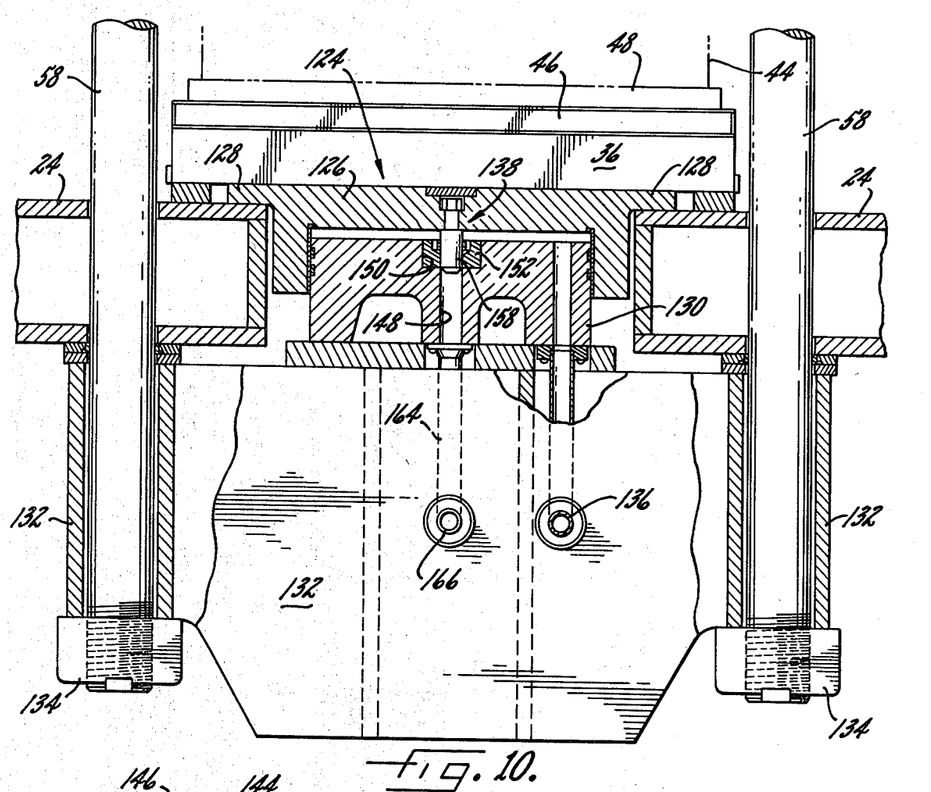
FIG. 10 is an enlarged, fragmentary sectional view of the lower half of the exemplary embodiment illustrated in FIG. 1, and showing, in detail, the main clamp cylinder which is employed to develop the forces necessary to maintain the mold together, the cylinder being depicted in position prior to its actuation.
Figure 11:
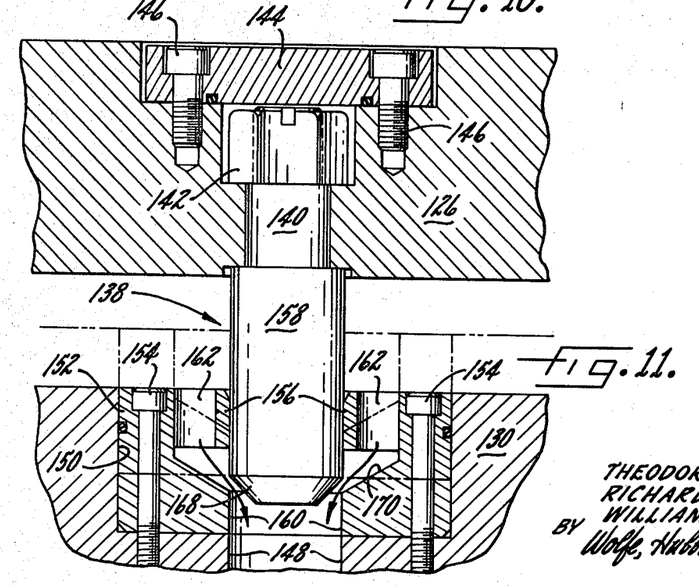
FIG. 11 is an enlarged, fragmentary section of the relief valve illustrated in FIG. 10 that prevents overstroke of the cylinder, except showing the valve after it has opened so that the hydraulic fluid supplied to the piston of the main cylinder is discharged to relieve the force developed.
Figures 12, 13, 14:
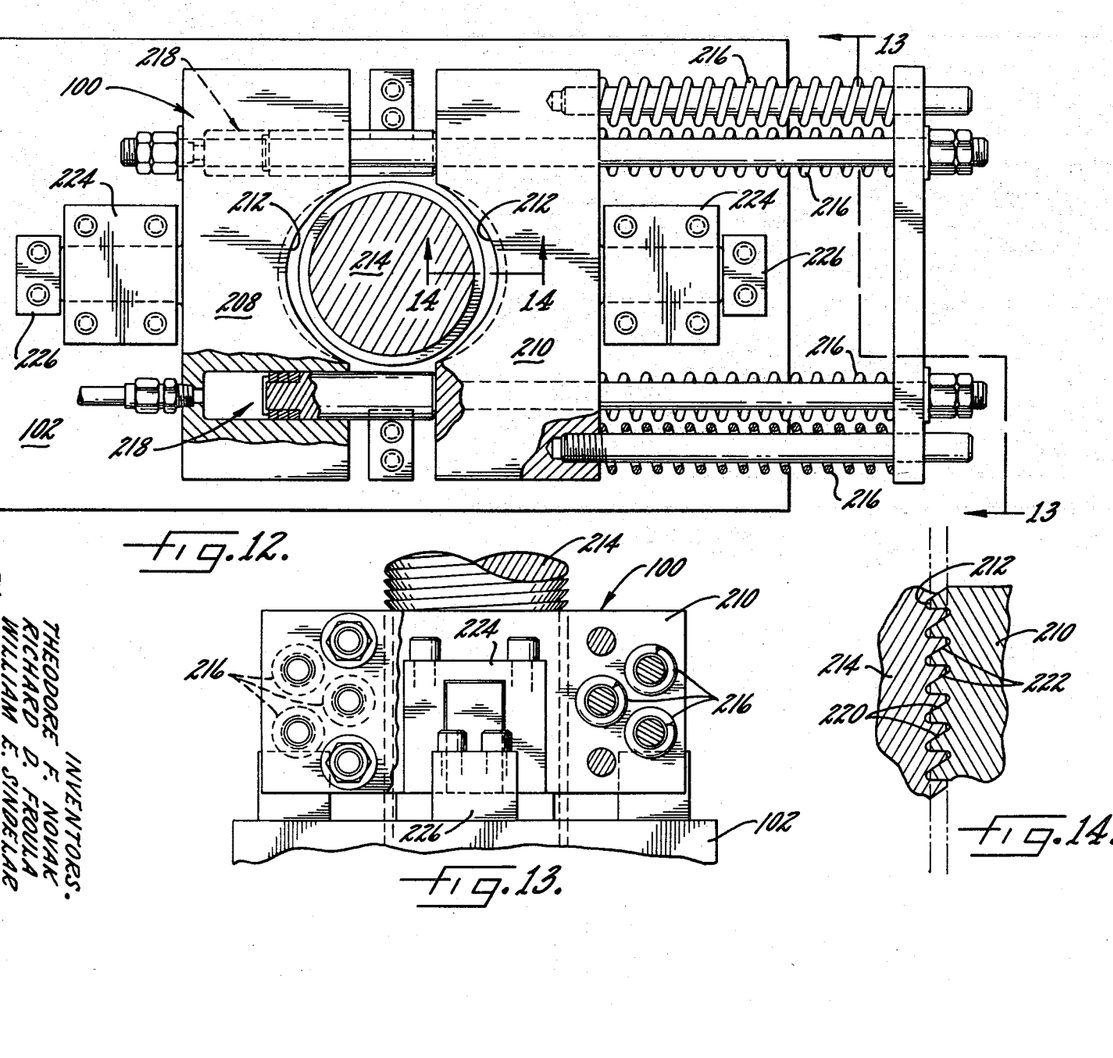
FIG. 12 is a top plan view and illustrating the safety feature which is actuated upon an electrical and/or hydraulic power failure to hold the upper power slide in a fixed position.
FIG. 13 is a fragmentary, cross sectional view taken substantially along offset line 13—13 of FIG. 12, and further illustrating the safety feature shown in FIG. 12.
FIG. 14 is a fragmentary cross sectional view taken substantially along line 14—14 of FIG. 12, except that the safety feature is illustrated in a closed position holding the upper power slide against movement.

A cover plate 144 is in turn attached to the head 126 by countersunk screws 146 to provide the head 126 with a substantially level surface which contacts the bolster-carrier 36. The piston 130 has a central passageway 148 therethrough that terminates in a countersunk portion, indicated at 150, into which there is placed the lower portion or plug 152 of the relief valve 138. It may be attached to the piston by any suitable means such as by bolts 154. The plug 152 includes an annular portion 156, centrally located in the plug and which is complementally shaped to receive the valve stem 158. The lower portion 152 also includes a passageway 160 in register with the central passageway 148 of the piston and an annular passageway 162 connecting the area between the head 126 and the piston 130 with the central passageway of the piston via the passageway 160.

As can be seen in FIG. 10, the valve stem 158 prevents the annular passageway from communicating with the passageway 160. When the hydraulic fluid is introduced between the head and the piston through conduits 136, the piston 130 together with the plug 152 of the relief valve is moved downwardly and the valve stem continues to prevent the normal communication until the piston has travelled downward past the bottom of the valve stem. The annular passageway 162 is then connected to the central passageway 148 of the piston through the passageway 160 of the plug of the relief valve. The hydraulic fluid exits through conduits 164 and 166 to thereby limit the downward travel of the piston.

The annular passageway and the valve stem 158 both may be tapered as at 168 and 170 to streamline the flow path for the hydraulic fluid when the relief valve is opened. The distance that the piston can travel before the relief valve is opened can be varied as desired by merely replacing the plug of the valve.

INJECTION ASSEMBLY

The plastic material can be injected into the hot runner plate by any conventional mechanism after the main clamp cylinder has been actuated to develop the forces necessary to prevent the mold from being forced apart by the pressure associated with the injection molding of the plasticized material into the mold cavity. The particular injection mechanism 29 does not form any part of this invention and any other suitable capacity injection apparatus may be utilized as will be apparent to those skilled in the art. In the illustrative embodiment, the exemplary injection assembly 29 (FIG. 1) is mounted for slidable movement on a platform 174 disposed to the side of the injection molding machine 20. The assembly 29 includes a hopper 176 and an extrusion screw 178 (FIG. 5) together with a conventional hydraulic system which can charge a thoroughly plasticized material equal in volume to that needed to fill the mold cavity and force this material at the predetermined pressure and rate.

Figure 5:
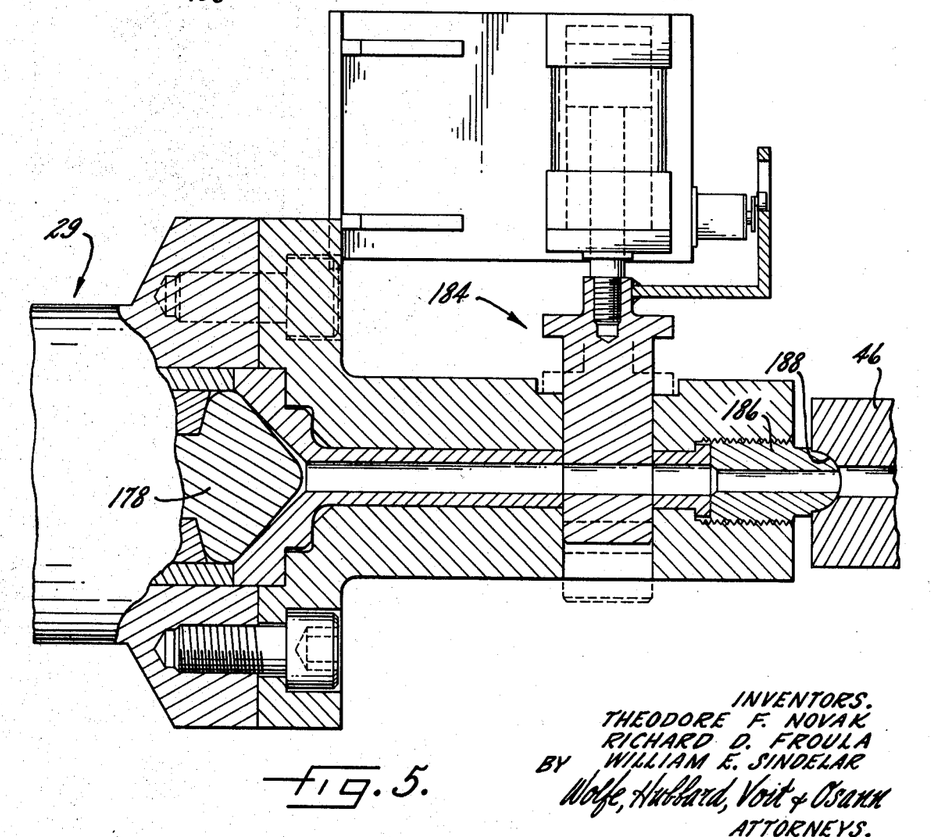
FIG. 5 is an enlarged cross sectional view taken substantially along line 5—5 of FIG. 4 and illustrating the passageway for the plasticized material from the mechanism supplying the material to the distribution plate for the material and the valve for closing the passageway.

The assembly itself can be moved into and out of position by fluid means such as hydraulic cylinder 180 shown in FIG. 1. There, hydraulic cylinder 180 is attached to the bed 24 of the frame and a piston shaft 182 is similarly attached to the injection assembly 29. The assembly can suitably be provided with a shut off valve 184 to cut off the flow of plasticized material passing from the extrusion screw 178 and into the hot runner plate 46 (FIG. 5).

Figure 4:
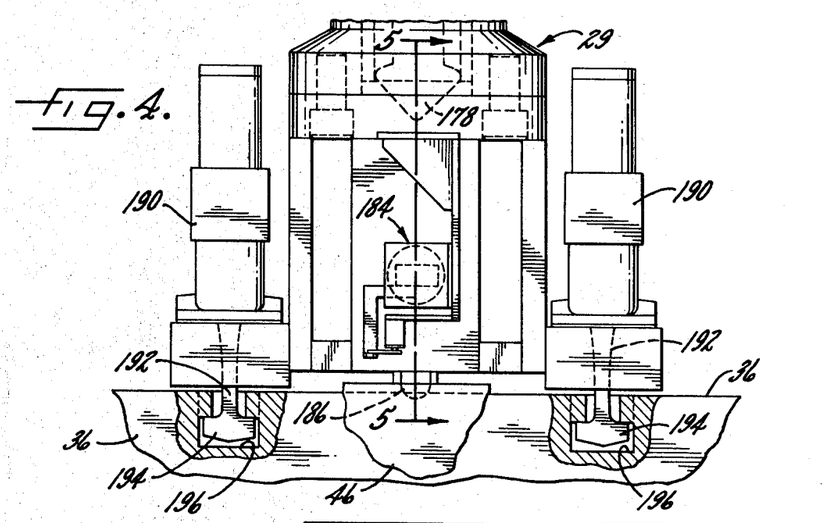
FIG. 4 is a cross sectional view taken substantially along line 4—4 of FIG. 1, except showing the exemplary mechanism that allows the means forwarding the plastic material to be quickly connected to the distribution plate carrying the plasticized material to the mold cavity in position adjacent the plate.

In accordance with another aspect of this invention, provision is made for quickly securing the injection assembly to the hot runner plate to achieve a tight fit while allowing it to be quickly broken if desired. Thus, as seen in FIG. 4, a screw nozzle 186 having a curved surface fits into the complementally shaped terminal portion 188 of the hot runner plate 46. Disposed on either side of the screw nozzle 186 are a pair of air clamps 190 each having an arm 192 with an attached head 194 to fit into a T-shaped portion 196 formed in the bolster-carrier 36.

Engagement of the injection assembly with the hot runner plate is easily effected by actuating the air clamps so that the heads 194 are pivoted and slip into the slots formed in the bolster-carrier 36 and are clamped tight. Disengagement is of course carried out by pivoting the heads so that the head can exit from the slot (FIG. 1).

STRIPPING STROKE

After the plastic has been injected into the mold cavity the article formed and the mold purged by water, air or other cooling means in any conventional manner such as by forming passageways for the water or the like leading to the mold cavity, the mold must be separated and the part removed. In accordance with still another objective of the present invention means are provided for rapidly developing sufficient force to overcome the force holding the mold together, including the weight of the upper power slide and upper mold portion. Thus, auxiliary hydraulic cylinders are provided to strip or lift the upper mold portion to separate the mold the distance previously set by the shut height adjustment. During this stripping stroke (see FIG. 7) the positive stop 100 and adjustable screw 94 remain in contact through the travel. Stripping cylinders 198 are accordingly positioned adjacent the bed 24 and are operably connected to the crosshead 104 by upstanding support 200 on which bracket portions 202 of the crosshead 104 are seated. Introduction of hydraulic fluid into the area 204 forces the crosshead 104 upwardly which in turn pushes the pull rods 58 upwardly by contact with flanges 206 on the pull rods. The upper and lower power slides, attached to the pull rods, are also moved upwardly. Typically, a force of 100 tons or more has been found suitable where the main clamp cylinder develops several thousand tons.

At the same time, the split nuts are moved to an open position and hydraulic fluid is supplied to the pull rod cylinders 68. The upper power slide 56 can then be moved into position for the initiation of the next cycle. Any conventional means can be used to knock out and remove the finished molded article from the mold cavity prior to the beginning of the next cycle.

SAFETY CLAMP

To ensure that an electrical failure or a pressure failure in the pull rod cylinders does not allow the upper power slide and upper mold portion to close on the lower mold and damage the machine, provision is made for allowing the upper slide and upper mold portion to be automatically held in position whenever a power failure occurs. To this end, and as is illustrated in FIGS. 7 and 12 through 14, the stop 100, which limits the downward extent of the stroke of the upper power slide, is formed in two identical portions 208, 210, each including an arcuate portion, indicated at 212 disposed about the periphery of a clamp shaft 214. Springs 216 are positioned adjacent portion 210 to bias it in a direction towards part 208. The cylinder portions 218 of the safety clamp nut are in communication with the pull rod cylinders so that any pressure failure will cause a loss in pressure. This will allow the bias of the springs 216 to take over and clamp the nut firmly around the clamp shaft 214. Both the communicating portions of the split nut and the shaft can be grooved as indicated at 220, 222, respectively (FIG. 14), to mate together to ensure that the clamp shaft, and thus the power slide, will be held in position. Guides 224 and stops 226 can be provided to limit the outward extent of the two portions of the safety clamp nut.

HYDRAULIC POWER AND CONTROL SYSTEM

To carry the vertical injection molding machine of this invention through the various phases of the operation, a single source of hydraulic power could probably be employed. However, to maximize the efficiency and to ensure that the machine parts will not be damaged by the use of either excess or insufficient power, multiple pressure lines of varying magnitude can be used.

Typically, and as shown in the illustrative embodiment, three hydraulic pressure lines may be employed to provide the motive power for controlling and operating the molding machine. Considering a machine capable of developing about four thousand tons of force or more, one of the pressure lines can suitably be capable of developing about 2,000 pounds per square inch pressure while another can provide a pressure of about 3,000 p.s.i. These pressure lines provide the power to carry out such functions as raising and lowering the upper and lower power slides and moving the injection assembly into and out of position. Pilot pressure for controlling check valves, hydraulically operated directional valves and similar equipment may be provided by a pressure line capable of developing a pressure of about 500 p.s.i. Actual operation will, as is well known, probably require an additional pressure line (not shown) for functions such as cleaning, recirculating and heat exchange. A source or sources of air may be provided to carry out such functions as clamping the injection assembly to the bolster-carrier and actuating the pull rod split nuts and these will be discussed in connection with the operating cycle of the molding machine of this invention.

Figure 15A:
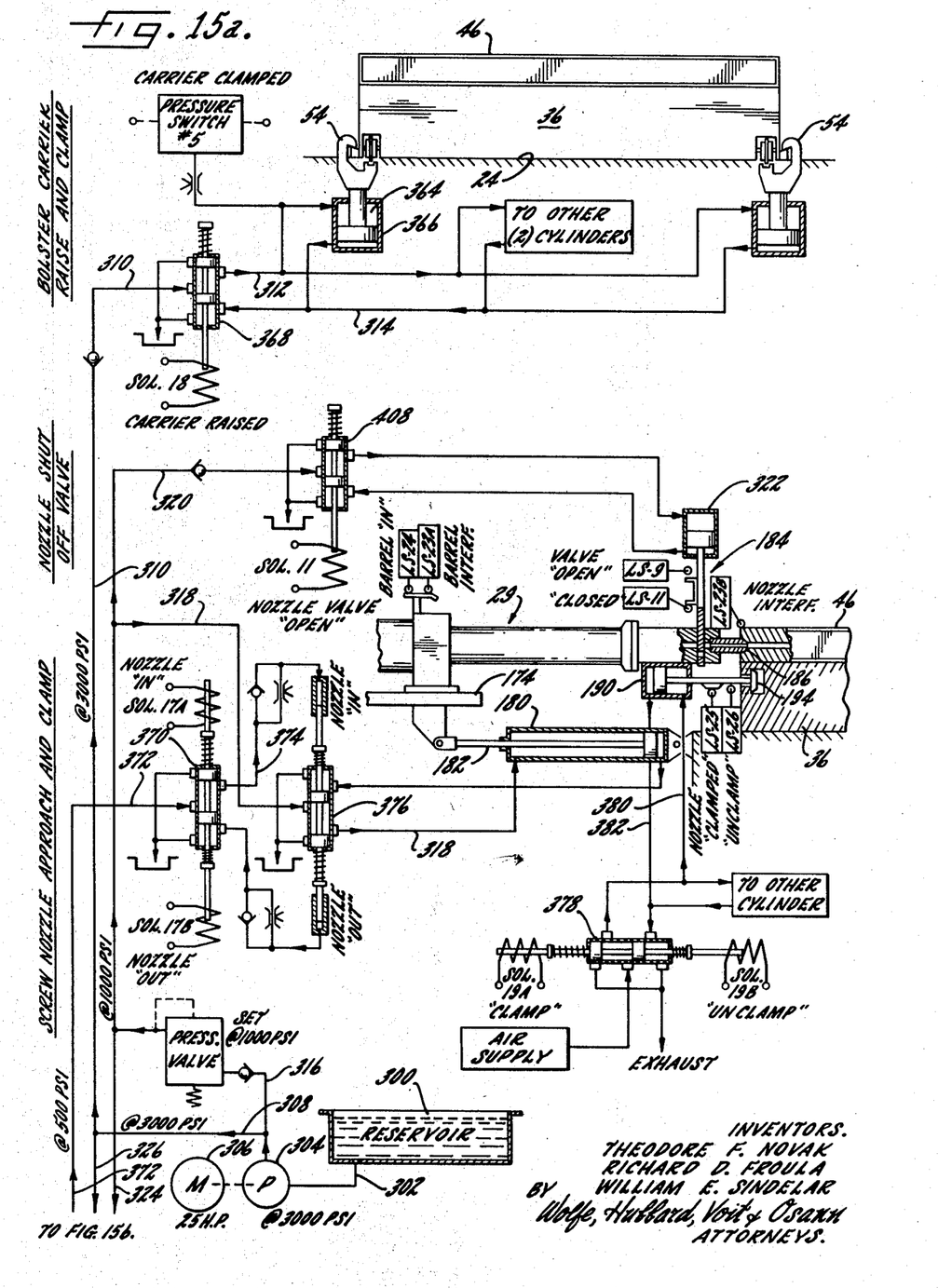
FIG. 15a through d together form a schematic view illustrating an exemplary hydraulic system together with certain electrical controls for the vertical injection molding machine of this invention.

As shown merely by way of example, FIGS. 15a through d illustrate an exemplary hydraulic system employing the various power sources hereinbefore discussed. FIG. 15a illustrates a first hydraulic fluid reservoir 300 having a supply line 302. Supply line 302 has interposed therein a variable volume pump 304 capable of developing about 3,000 p.s.i. A conventional 25 horsepower motor 306 drives the pump 304.

Figure 15B:
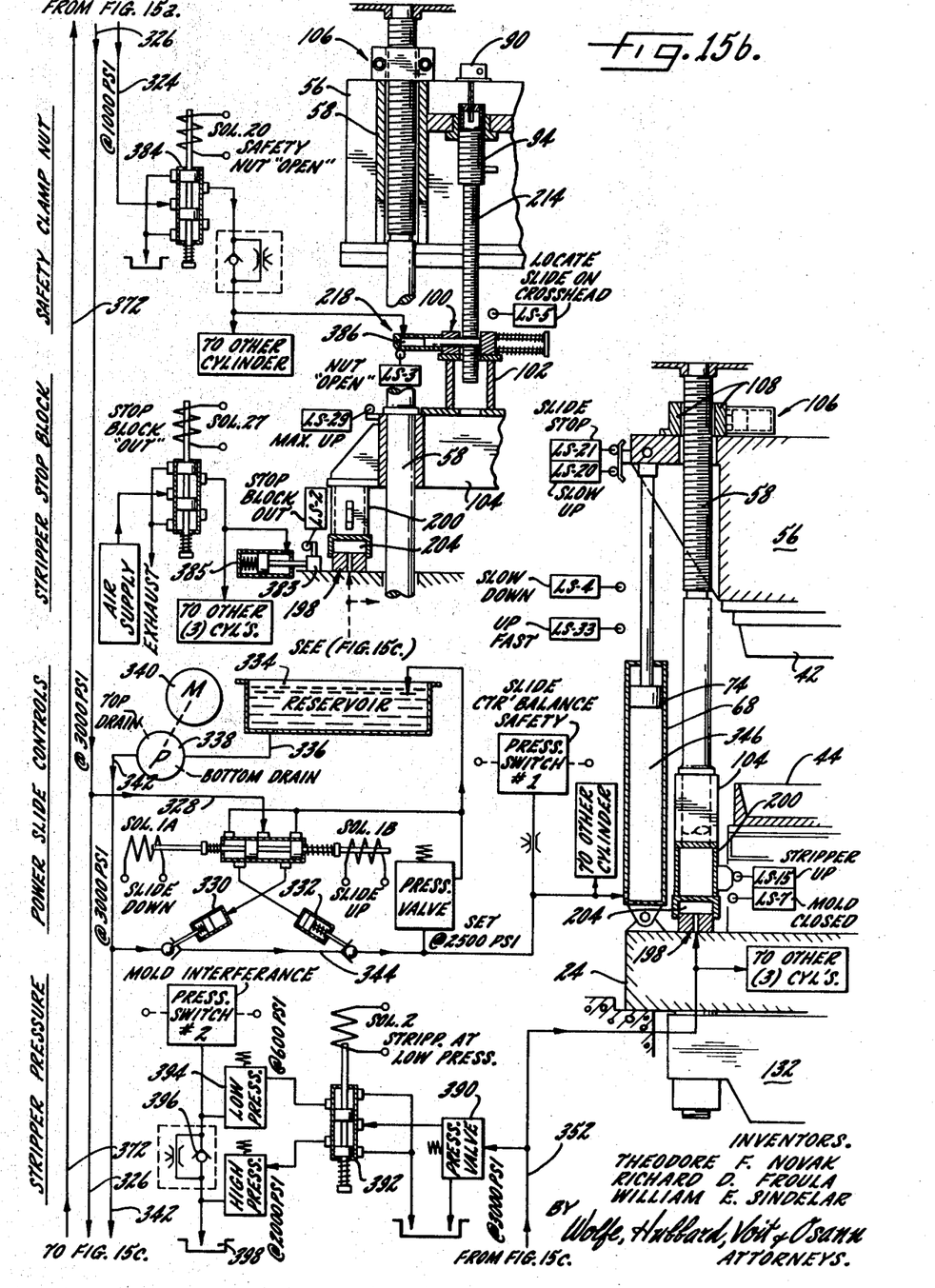
Figure 15C:
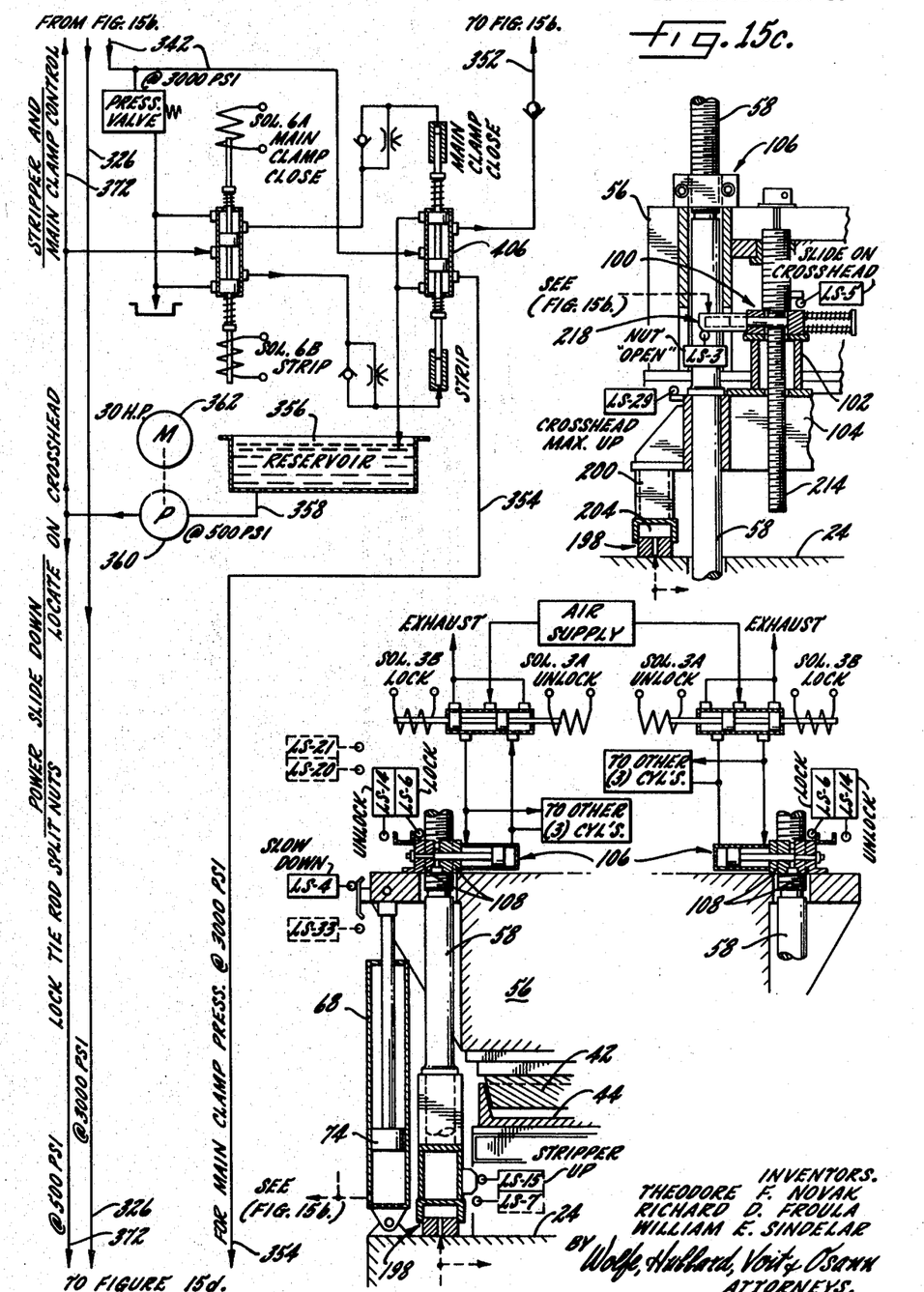
Figure 15D:
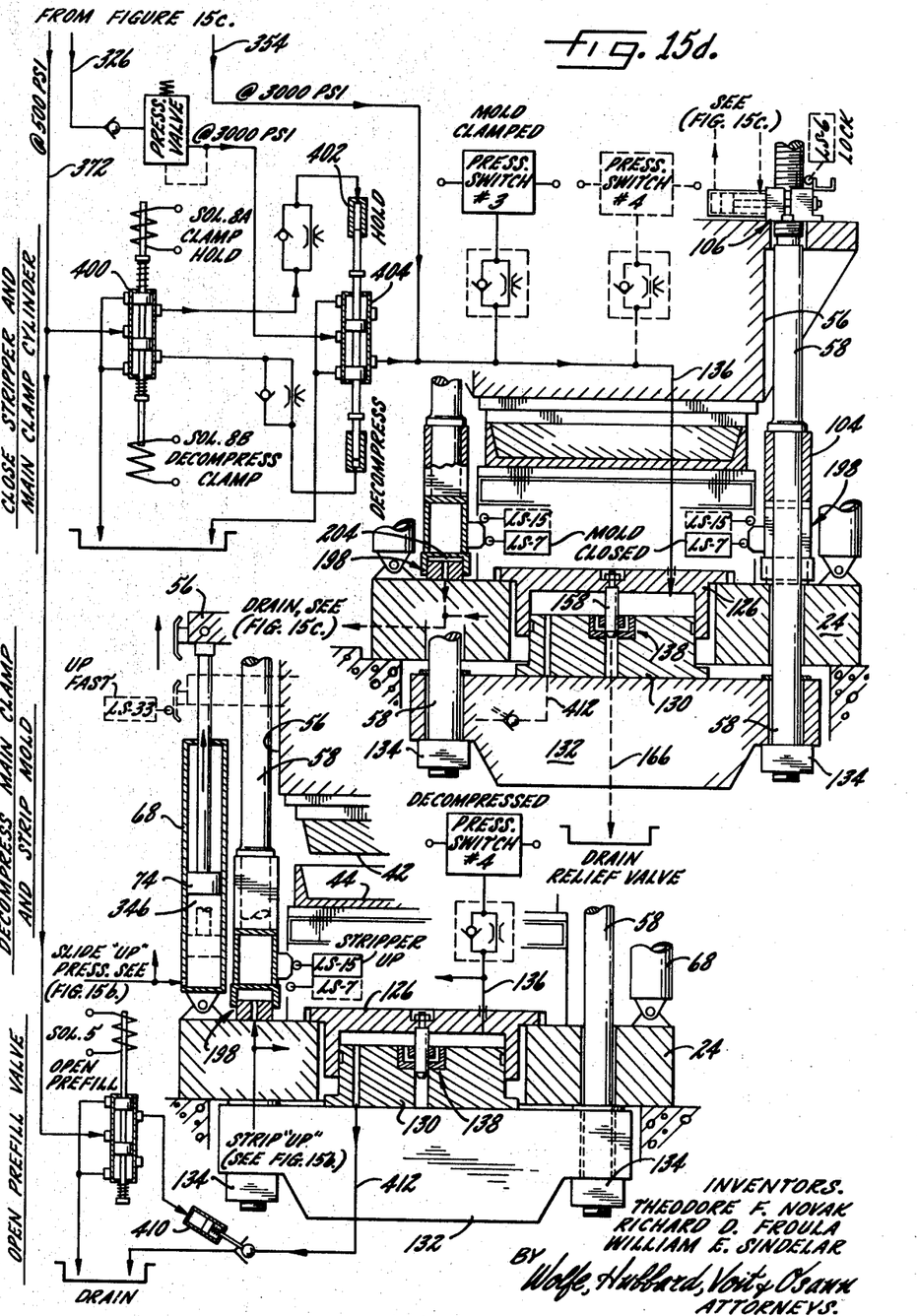

The 3,000 p.s.i. pressure supply line 302 provides the power for clamping the bolster-carrier to the machine bed (FIG. 15a), moving the injection assembly into position (FIG. 15a), closing the shut-off valve of the injection assembly (FIG. 15a), controlling the check valves in the line leading to the pull rod cylinders (FIG. 15b), holding the safety clamp nut open (FIG. 15b) and clamping the mold together by connection to the main cylinder (FIG. 15d).

As seen in FIG. 15a, clamping the bolster-carrier 36 to the bed 24 is carried out by hydraulic fluid supplied via lines 302, 308 and 310 to the rod end 312 of clamps 54. Return line 314 leads to reservoir 300. Hydraulic fluid for moving the injection assembly into and out of position is forwarded through lines 302, 316 and 318 to the hydraulic cylinder 180. The shut-off valve 184 of the injection assembly 29 is open and closed by supplying fluid through lines 302, 316 and 320 to the cylinder 322.

In connection with ensuring that the upper power slide will not fall if there is a power failure, a supply line 324 connects line 316 to the safety nut 100 to maintain it in an open position as long as there are no interruptions in the fluid flow (FIGS. 15a and 15b). As also seen in FIG. 15b, to operate the check valves in the supply line leading to the pull rod cylinders, supply lines 326 and 328 connect the 3,000 p.s.i. line to the check valve assemblies 330 and 332.

The other function of the 3,000 p.s.i. line, i.e.—clamping the mold, is carried out by forwarding fluid through line 326 to join with the other pressure line in line 136 to supply the fluid to the main clamp cylinder 124 to clamp and hold the mold halves together (FIG. 15d).

The other major pressure line provides the power for raising the upper power slide, moving the stripping cylinder through the stripping stroke and cooperating with the 3,000 p.s.i. line to clamp and hold the mold halves together. To this end, and as illustrated in FIG. 15b, a reservoir 334 provides hydraulic fluid via fluid supply line 336 to a second variable volume pump 338 driven by a 150 horsepower motor 340. While a single pump and motor have been illustrated, it should be appreciated that a number of pumps and a corresponding number of driving means could be employed if needed to economically develop a particular pressure. Indeed, when used in connection with a molding machine capable of developing about four thousand tons pressure, it has been found suitable to have four variable volume pumps, each capable of delivering about 3,000 p.s.i. pressure, operating in series.

Stroking the upper power slide upwardly is accomplished by forwarding hydraulic fluid through supply line 336 and lines 342 and 344 and into the piston end 346 of the pull rod cylinder 68. The stripping cylinders are raised by fluid passing through lines 342 and 352 and into area 204 (FIGS. 15b and c). Fluid passing through lines 342 and 354 joins the 3,000 p.s.i. line (FIG. 15d) to move the piston 130 of the main clamp cylinder 124 downwardly to close and clamp the mold halves.

The pilot pressure for activating check valves and hydraulically operated directional valves utilizes a reservoir 356 (FIG. 15c) connected by supply line 358 to a variable volume pump 360 and a 30 horsepower motor 362. The many uses of the pilot pressure will be discussed in connection with the operating cycle of the vertical injection molding machine of this invention.

INJECTION MOLDING MACHINE OPERATING CYCLE

Preliminary to initiation of an operating cycle, certain ancillary steps must be carried out. Thus, the bottom part of the mold is secured to the hot runner plate which is in turn secured to the bolster-carrier by any conventional means such as bolts (not shown). The bolster-carrier is then moved into the machine area, lowered and clamped to the bed of the machine. To this end and as shown in FIG. 15a, hydraulic fluid is supplied to rod end 364 of cylinder 366 of the clamps 54. Maintenance of adequate clamping pressure in the cylinders may be ensured by a pressure switch PS5 connected to line 312. Suitably, the switch may be set to trip at 2700 p.s.i. and reset at 2500 p.s.i. A solenoid controlled, directional valve 368 is also used in line 310. Energizing solenoid S18 allows the bolster-carrier to be raised and removed from the machine area.

After the bolster-carrier is in position, the upper power slide 56 can be stroked downwardly to secure the upper half of the mold 42 thereto. Also, before the machine cycle begins, the shut height adjustment that has been hereinbefore described is made to ensure that the downward stroke leaves the mold parts a predetermined distance apart.

Similarly, the injection assembly 29 should be moved into position. As also shown in FIG. 15a, this is carried out by activating solenoid S17A which moves a directional valve 370 to allow pilot pressure in line 372 to move through line 374 and in turn move the hydraulically controlled directional valve 376 to pass the pressure line 318 to the rod end of the cylinder 180. Similarly, to move the injection assembly out of position and away from the injection molding machine, the solenoid S17B may be energized and the solenoid S17A deenergized.

When the injection assembly 29 has been moved into position, one feature of this invention provides that the assembly can be quickly locked into position. Thus, limit switch LS–24 signals the fact that the injection assembly is in position and solenoid P19A (FIG. 15a) is energized. This allows an air supply from a source not shown to pass through a directional valve 378 and, via line 380, into the rod end of the air clamp 190. Air may be similarly exhausted from the head side of the air clamp via line 382. Energizing solenoid P19B allows the injection assembly 29 to be quickly unclamped from the molding machine.

After these operations have been carried out, the upper power slide can be moved upwardly to its idle position as will hereinafter be described so that the repetitive machine cycle can be initiated.

With the molding machine of this invention in the idle position, the machine is checked and made ready to ensure that the upper power slide may safely begin its downward stroke. To this end, limit switches LS–11 (FIG. 15a), 12 (not shown) and 14 (FIG. 15c), respectively, are checked to ensure that the nozzle valve of the injection assembly 29 is closed, the injection assembly extrusion screw 178 has been returned to its original position and the pull rod split nuts 106 are unlocked. Safety gates (not shown) can then be moved into position to close off the machine area and prevent possible danger to personnel in the area.

At this point, the pilot pressure system is checked to ensure it is loaded; and, through pressure switch PS1 (FIG. 15b) it is likewise determined that the pull rod cylinders contain a solid column of fluid. Stripper stop blocks 383 which may be positioned between the stripping cylinders 198 and the bed 24 (FIG. 15b) to ensure that the mold cannot close when the machine is in an idle position, are moved out of the path of the stripper cylinders by an air supply from a source (not shown). Energizing solenoid S27 allows air to pass to the rod end of cylinder 385 to move the blocks 383 from beneath the stripper cylinders 198. Limit switch LS2 signals that the blocks are out of the path. Also the safety split nut portions 208, 210 are spread apart and maintained in that position (limit switch LS3 being the check signal) by energizing solenoid S–20 which allows fluid to pass through directional valve 384 and into cylinder 386 (FIGS. 15b and c). To insure that the upper power slide has not settled while in an idle position, fluid may be supplied to the pull rod cylinders to again place it at its proper upward extent.

The molding cycle is then begun by starting the upper power slide on its downward stroke at a speed in the range of up to about 1200 inches per minute. As illustrated in FIG. 15b, solenoid S1A may be energized to move a directional valve 388 and allow hydraulic fluid from line 328 to open the check valve assembly 32 to meter fluid out of the pull rod cylinders. The rate is determined by the pump 338 which diverts its flow through another port and into a drain (not shown).

The power slide thus, in effect, acts as a huge piston to force hydraulic fluid out of the pull rod cylinders and through the pump. Regulation is provided by varying the amount of fluid that can pass through the pump. The motor driving the pump serves as a braking force; and this operation, with the tendency to oppose the braking force, recharges, in effect, the motor.

As the downwardly moving upper power slide 56 trips limit switch LS-4, the pump volume control is decreased so that the power slide continues to descend but at a slower speed, i.e.—zero to 150 inches per minute. The downward movement continues until the limit switch LS–5 is tripped; and, at this point, solenoids P3B and P4B (FIG. 15c) are energized so that air from a source (not shown) causes the portions 108 of split nuts 106 to come together and lock the upper power slide in position relative to the pull rods and the lower power slide. Limit switches LS–6 signal that the split nuts are closed.

With the mold parts now spaced apart by the distance set in the shut height adjustment, they are brought together. This is accomplished (FIG. 15b) by energizing solenoid S2 so that the pressure in the stripping cylinders 198 can be decompressed. The fluid flows out of the stripping cylinders, through a pressure valve 390, suitably set at about 3,000 p.s.i, and is diverted through a solenoid controlled directional valve 392 to a low pressure valve 394, suitably set at about 600 p.s.i. Limit switch LS-7 indicates that the mold is closed.

In accordance with one feature of the subject invention, there is provided a method of signaling the presence of a foreign object in the mold that interferes with the closing of the mold. As fluid is being removed from the stripping cylinders, the upper mold part closes onto the lower. However, if a foreign object such as a wrench has been left in the mold, the downward movement of the upper mold part 42 would be opposed by the presence of the wrench and damage to components of the machine, particularly the mold, could result.

Thus, as shown in FIG. 15b, means are provided to sense when the closing of the upper mold through the shut height distance begins to experience interference. To this end, with solenoid S–2 having been energized to decompress the stripping cylinders, the fluid passes through pressure valves 390 and 394. At this point, the fluid pressure builds up until 65 p.s.i. is reached and a check valve 396 is then opened and the fluid is dumped to a drain 398. If interference is encountered, the pressure will drop, indicating interruption of flow, and a pressure switch PS2 will then signal the flow interruption when the pressure doesn't build up to 50 p.s.i. PS2 can suitably reset at 40 p.s.i. While the flow is interrupted when the mold is closed, the signal is ignored because limit switch LS-7 indicates that the mold is closed.

To clamp the mold and hold it in position against the disrupting force that is caused by injecting plastic into the mold cavity, hydraulic pressure is supplied to the main clamp cylinder. As shown in FIG. 15d, fluid from the 3,000 p.s.i. line is directed to the main clamp cylinder by energizing solenoid S8A. Pilot pressure passes from line 372, through a solenoid controlled directional valve 400 and into a cylinder 402. Cylinder 402 moves a hydraulically controlled directional valve 404 to allow fluid to pass through line 326 and into line 136 which communicates with the main clamp cylinder.

Similarly, solenoid S6A (FIG. 15c) is activated to allow pilot pressure to move the setting of a hydraulically controlled directional valve 406. Fluid from the other pressure source passes through line 342, is diverted through the directional valve 406 and joins the 3,000 p.s.i. pressure line when lines 354 and 326 come together.

With the mold closed and held in a clamp position, the plastic is injected into the mold cavity. To this end and as shown in FIG. 15a, solenoid S11 is activated to set a directional valve 408 to allow fluid line 320 to communicate with the rod side of cylinder 322 to open gate valve 194, limit switch LS-9 indicating that the gate has been moved out of the path of the plastic which may then be injected. From the start of the injection, a conventional timer may be used to limit the injection time. Thus, if the nozzle becomes clogged or blocked for any reason, the injection will not continue beyond the normal operating cycle. Similarly, if desired, the injection assembly may include a second injection step that begins after the initially molded material has had an opportunity to cook and shrink. At the end of the injection, the gate valve 184 is closed by deenergizing the solenoid S11. As the gate is lowered, limit switch LS–11 is tripped to signal that the valve is closed.

The mold can then be purged by a water or other cooling cycle as is well known in the art. Similarly, the injection assembly 29 can be made ready for the next cycle by, as is also known in the art, rotating the screw, and reloading to provide another charge of a predetermined amount.

After the molded article has been allowed to cool and become cured, set or otherwise completely formed, the mold pressure is decompressed. Thus, solenoid S5 (FIG. 15d) is energized so that pilot pressure opens check valve assembly 410 and the prefill to the main clamp cylinder is opened so that fluid can egress from the cylinder through line 412. Also, solenoid S8B is energized and the pilot pressure, in turn, changes the position of the directional valve 404 to prevent the 3,000 p.s.i. pressure line from reaching the main clamp cylinder 124. Pressure switch PS4 is similarly activated to decrease the flow of the 2,000 p.s.i. pressure line to the main clamp cylinder.

The pull rod split nuts are then unlocked and stripping takes place. As can be seen in FIG. 15c, solenoid S6B is energized and the directional valve 406 allows pressure line 342 to flow to the stripping cylinders 198 to raise the crosshead through the stripping stroke. LS–15 indicates that the stripper has reached the shut height adjustment. Solenoids P3A and P4A are also energized to unlock the pull rod split nuts with limit switches LS–14 indicating that the split nuts are unlocked. At the same time, solenoid S1B is energized and S1A deenergized to open check valve assembly 330 and (FIG. 15b) to supply hydraulic fluid through line 344 to the pull rod cylinders 68.

The upper power slide continues to move upwardly and the speed is increased by providing more fluid to the cylinders. The speed increases when the upper power slide trips the limit switch LS–33. And, as the power slide reaches its idle position, limit switch LS–20 is tripped and the fluid supply is modified to slow down the power slide.

With the upper power slide in its idle position, the safety nuts can then be closed and the stripper stop blocks placed in position. The pilot system can then be unloaded and the safety nuts checked to ensure that they are closed. The safety gate can also be opened and the molded part removed.

It should be appreciated that the molding of some parts may require that a hole in the mold be formed or that a pocket or the like should be formed. In this instance, it will be necessary to utilize core cylinders shaped complementally with the particular discontinuity. As is conventionally known, these cores can be inserted as desired. Similarly, knockout means for removing the molded part from the machine area can be included if desired.

While the above-described cycle was directed to a semiautomatic, single sequence operation, it is apparent that a repetitive cycle can be easily established by simply omitting certain of the steps hereinbefore set forth. Thus, as soon as the upper power slide trips limit switch LS–20 and approaches its idle position, hydraulic fluid is removed from the pull rod cylinders by varying the operation of the volume pump so that hydraulic fluid from the cylinders is drained through the pump itself. The upper power slide thus begins its downward stroke for the next cycle. When the machine is operating on an automatic cycle, the safety gates may be advantageously provided with cutout portions so that the molded part may be removed without opening the safety gates themselves.

Thus, as has been seen, the present invention provides vertical injection molding machines that can be utilized to develop forces of several thousand tons or more yet which are of an economically and relatively compact arrangement. The novel molding machines are capable of developing the forces without the necessity of overhead hydraulic systems. The total cycle time necessary to form an article may be up to 25% or more less than would be required for a horizontal machine of the same size. In accordance with one feature, the amount of force holding the mold together can be automatically controlled so that excessive forces which may develop can be easily dissipated. Similarly, the machine includes auxiliary means that prevent over stroke of the main clamp cylinder. As a safety feature, another aspect of this invention includes automatically controlling the stroke of the upper power slide so that it will be held in position to prevent a premature downward stroke if a power failure were ever to occur.

We claim as our invention:

1. In a vertically oriented injection molding machine for molding articles in a mold including an upper portion and lower portion defining a mold cavity therein, the combination comprising an upright frame having bed means for receiving the lower mold portion, an upper power slide carried by said frame adapted to be raised and lowered through a predetermined stroke, means for detachably holding said upper mold portion to the power slide, said lower mold portion being adapted to be positioned on said bed to mate with the upper mold portion when the latter is brought into contact with said lower mold portion, first fluid means for rapidly raising and lowering the upper power slide through said predetermined stroke, means for limiting the initial downward stroke of the upper power slide so that the upper mold portion falls short of contacting said lower mold portion by a predetermined distance, a lower power slide disposed beneath said bed, a plurality of drive members attached to said lower slide and projecting upwardly within said frame, means for clamping said upper power slide to said drive members when said upper power slide reaches the limit of its initial downward stroke, and second fluid means associated with said lower power slide operative after said upper power slide has reached the limit of its initial downward stroke to pull said upper power slide down through the predetermined distance bringing said upper mold portion and lower mold portion into contact.

2. An injection molding machine as claimed in claim 1 wherein said means for limiting the initial downward rapid stroke of the upper power slide comprises means including a crosshead attached to said drive members and positioned above the bed means.

3. Apparauts as claimed in claim 2 further including third fluid means communicating with said crosshead means to be actuated after molding is completed to move said crosshead and said lower power slide upwardly through said predetermined distance so that the upper mold part is stripped from said lower mold part.

4. An injection molding machine as claimed in claim 1 wherein said means for limiting the initial downward stroke of the upper power slide includes means attached to said upper power slide and spaced therefrom a predetermined vertical distance, stop means interposed in the downward path of said means attached to said upper power slide and means capable of varying the predetermined vertical distance between said upper slide and said means attached to said upper power slide.

5. An injection molding machine as claimed in claim 1 which includes means disposed in the path of said second fluid means to divert said second fluid means from continuing to pull said upper power slide downwardly when said lower power slide has moved through a predetermined distance.

6. An injection molding machine as claimed in claim 1 which includes means connected to said first fluid means to prevent further downward movement of said upper power slide when the pressure of said second fluid means through the connection falls below a predetermined level.

7. An injection molding machine as claimed in claim 1 which includes an injection assembly capable of movement into communication with said mold cavity, said second fluid means being connected to said injection assembly to move said injection assembly into and out of position and air clamp means to hold said injection assembly in communication with said mold cavity.

8. Injection molding machine as claimed in claim 1 wherein said bed means are positioned substantially at ground level.

9. An injection molding machine as claimed in claim 1 which includes gib means associated with said upright frame and means connected to said upper power slide and communicating with said gib means to provide relative movement between said upper power slide and said drive members.

10. An injection molding machine as claimed in claim 3 which includes means connected to said first fluid means to signal an interruption of movement when the upper mold part is being moved into contact with the lower mold part.

References Cited

UNITED STATES PATENTS

| | | | |
|---|---|---|---|
| 2,916,678 | 12/1959 | Queré et al. | 18—30 |
| 2,976,569 | 3/1961 | Queré et al. | 18—30 |
| 3,093,863 | 6/1963 | Ehlert | 18—30 |
| 3,465,387 | 9/1969 | Allard et al. | 18—16 |

FOREIGN PATENTS 7,622  5/1964  Japan.

J. SPENCER OVERHOLSER, Primary Examiner

M. O. SUTTON, Assistant Examiner

U.S. Cl. X.R.

18—16